United States Patent
Kang et al.

(10) Patent No.: US 7,908,312 B2
(45) Date of Patent: Mar. 15, 2011

(54) NEWS SERVER FOR TRACKBACK BETWEEN NEWS AND BLOG AND METHOD FOR INTERCONNECTION THEREOF

(75) Inventors: Kuk-Jin Kang, Seoul (KR); Su Jin Yang, Seoul (KR); Mi Suk Eom, Seoul (KR)

(73) Assignee: NHN Corporation, Seongnam-si (KR)

( * ) Notice: Subject to any disclaimer, the term of this patent is extended or adjusted under 35 U.S.C. 154(b) by 183 days.

(21) Appl. No.: 12/161,628

(22) PCT Filed: Jan. 18, 2007

(86) PCT No.: PCT/KR2007/000301
§ 371 (c)(1),
(2), (4) Date: Jul. 21, 2008

(87) PCT Pub. No.: WO2007/083930
PCT Pub. Date: Jul. 26, 2007

(65) Prior Publication Data
US 2009/0094345 A1   Apr. 9, 2009

(30) Foreign Application Priority Data
Jan. 20, 2006   (KR) .................. 10-2006-0006462

(51) Int. Cl.
*G06F 15/16*   (2006.01)

(52) U.S. Cl. ........ 709/201; 709/203; 709/216; 709/218; 709/223

(58) Field of Classification Search .................. 709/218, 709/223, 201, 203, 216
See application file for complete search history.

(56) References Cited

U.S. PATENT DOCUMENTS

| | | |
|---|---|---|
| 2003/0233422 A1 | 12/2003 | Csaszar et al. |
| 2006/0242238 A1* | 10/2006 | Issa ................. 709/204 |
| 2007/0078904 A1* | 4/2007 | Yoon et al. .......... 707/200 |
| 2009/0083283 A1* | 3/2009 | Shardanand ........ 707/10 |

FOREIGN PATENT DOCUMENTS

| | | |
|---|---|---|
| JP | 2005-250826 A | 9/2005 |
| KR | 10-2005-0066246 A | 6/2005 |
| KR | 10-2005-0094637 A | 9/2005 |
| KR | 10-2006-0031471 A | 4/2006 |

OTHER PUBLICATIONS

Pingback and trackback—explained in the light of bidirectional links, Bengston, Samuel, Sring 2005, Umea University.*
Naver Open Dictionary, Dec. 3, 2003, pp. 1-24.
Media Today, Aug. 2, 2005, pp. 1-2.

* cited by examiner

*Primary Examiner* — Djenane M Bayard
(74) *Attorney, Agent, or Firm* — H.C. Park & Associates, PLC

(57) ABSTRACT

The present invention provides a news server for trackback between a news and a blog and a method for interconnecting thereof. According to the present invention, news and blogs can be interconnected therebetween thereby enabling news readers to exchange their in depth opinion with one another and to efficiently manage their own news comment.

20 Claims, 13 Drawing Sheets

[Figure. 1]
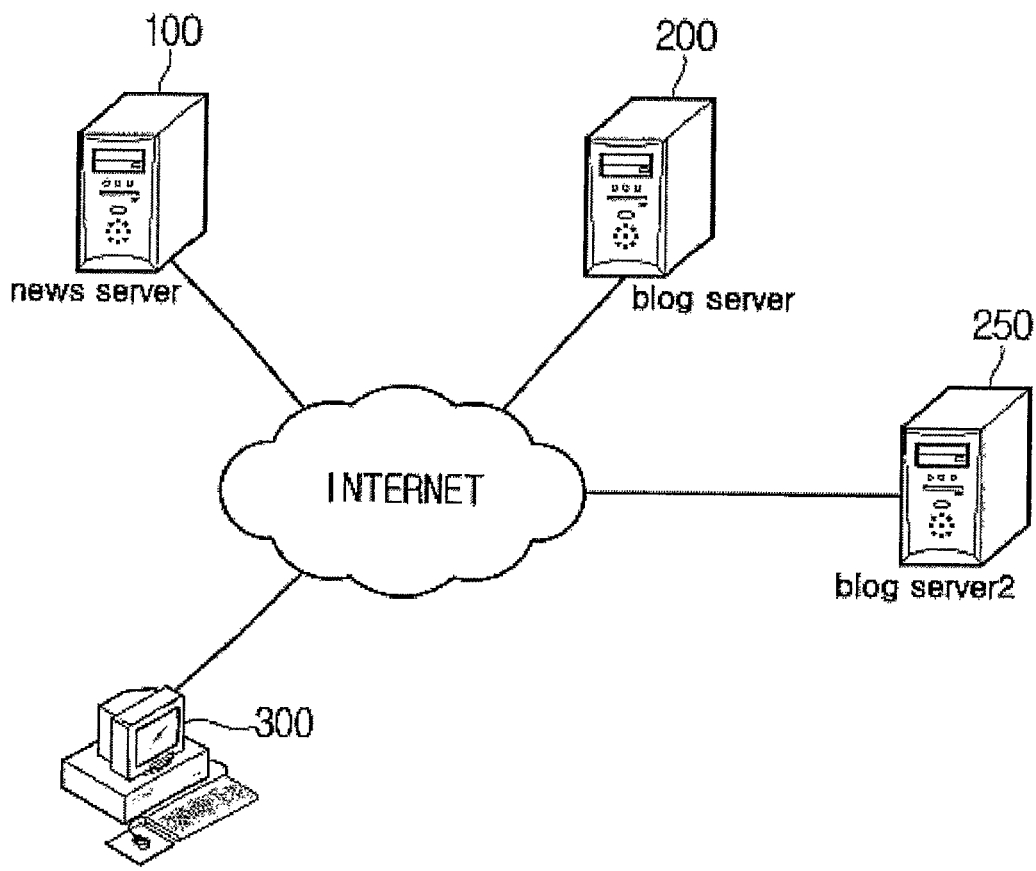

[Figure. 2]
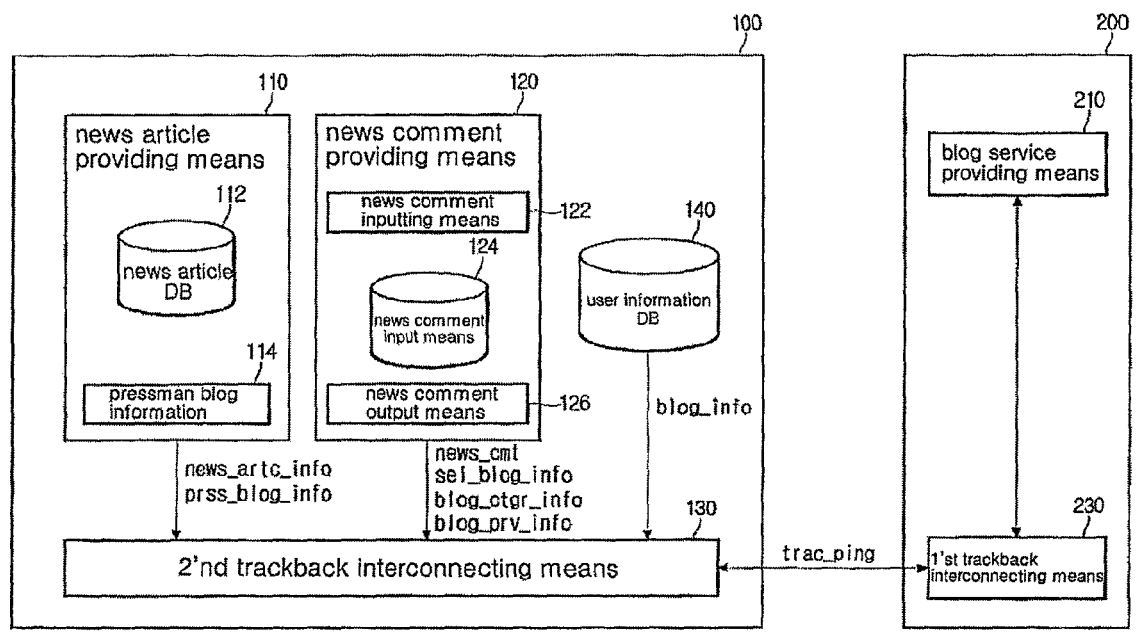

[Figure. 3]
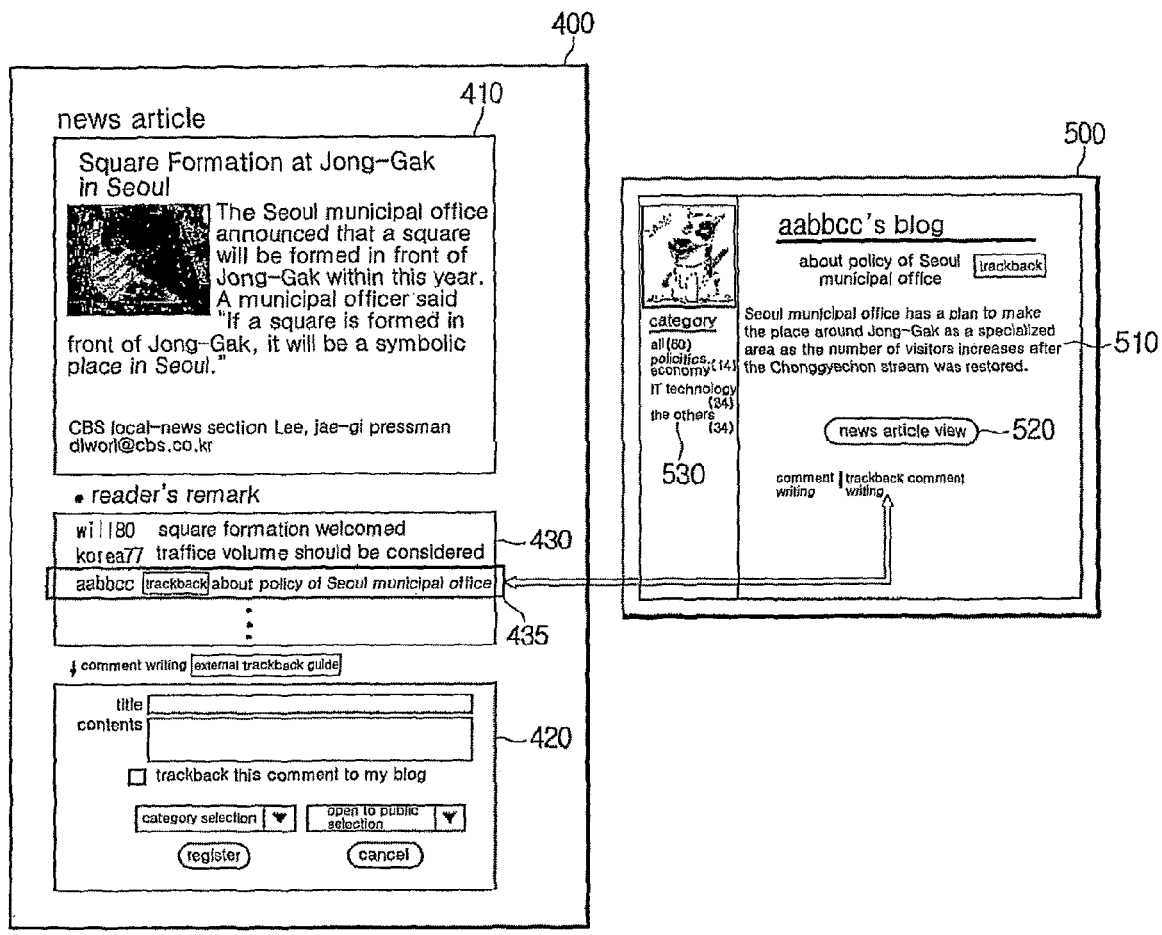

[Figure. 4]
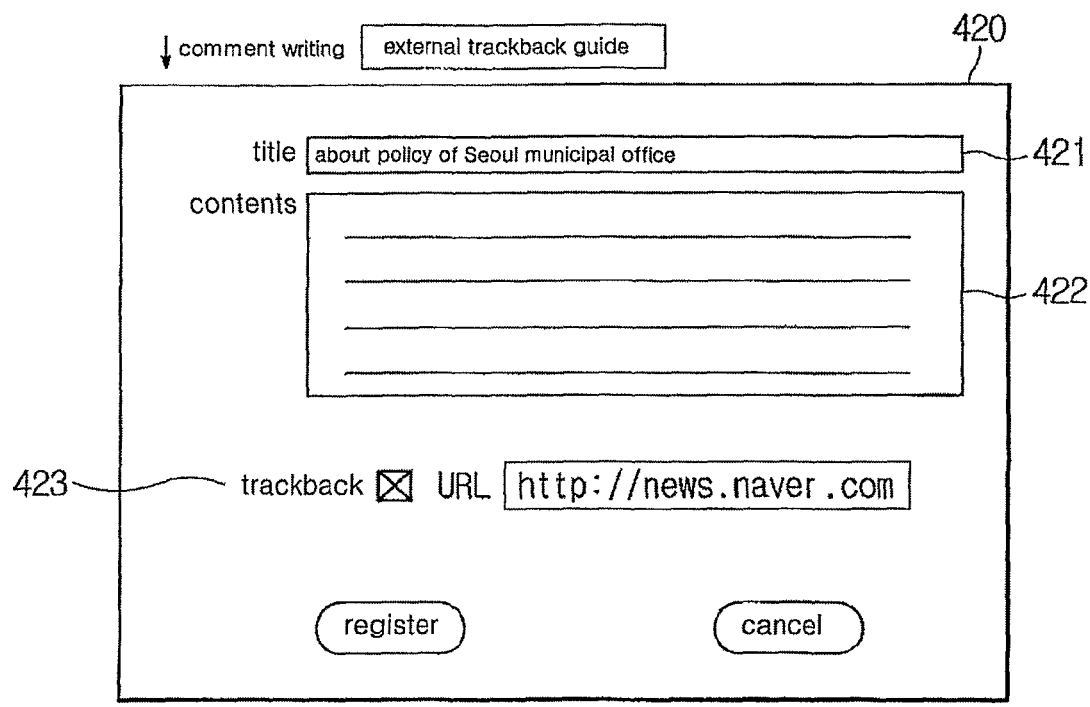

[Figure. 5]
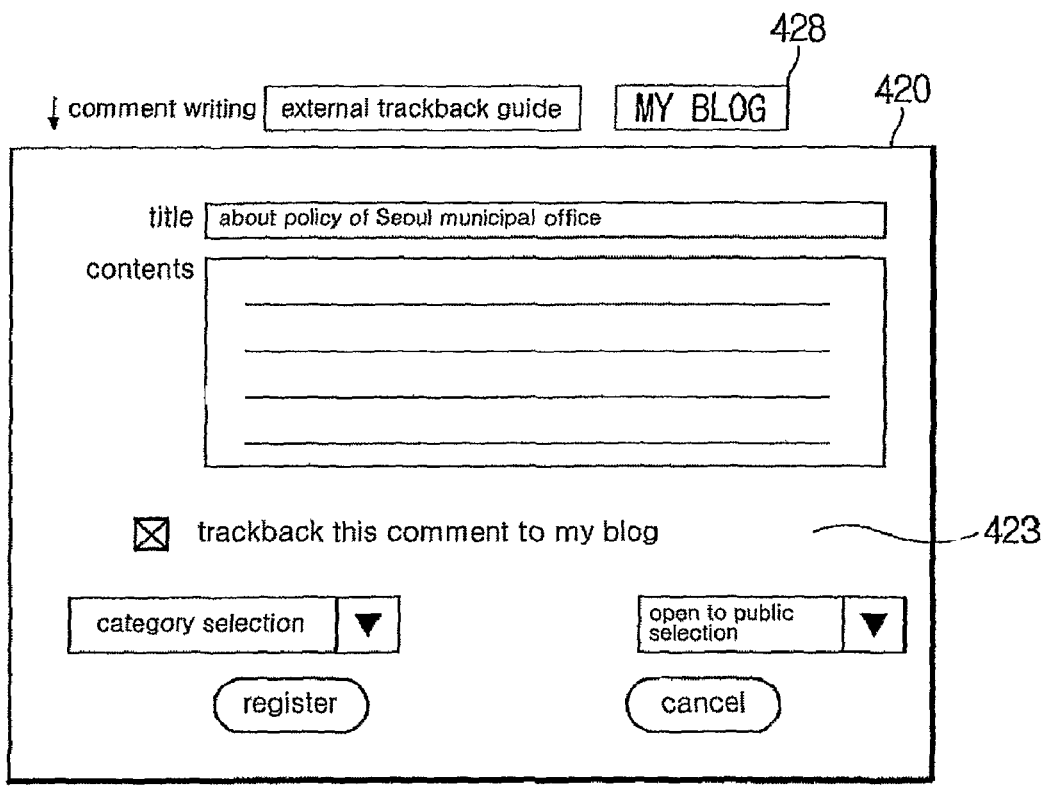

[Figure. 6]
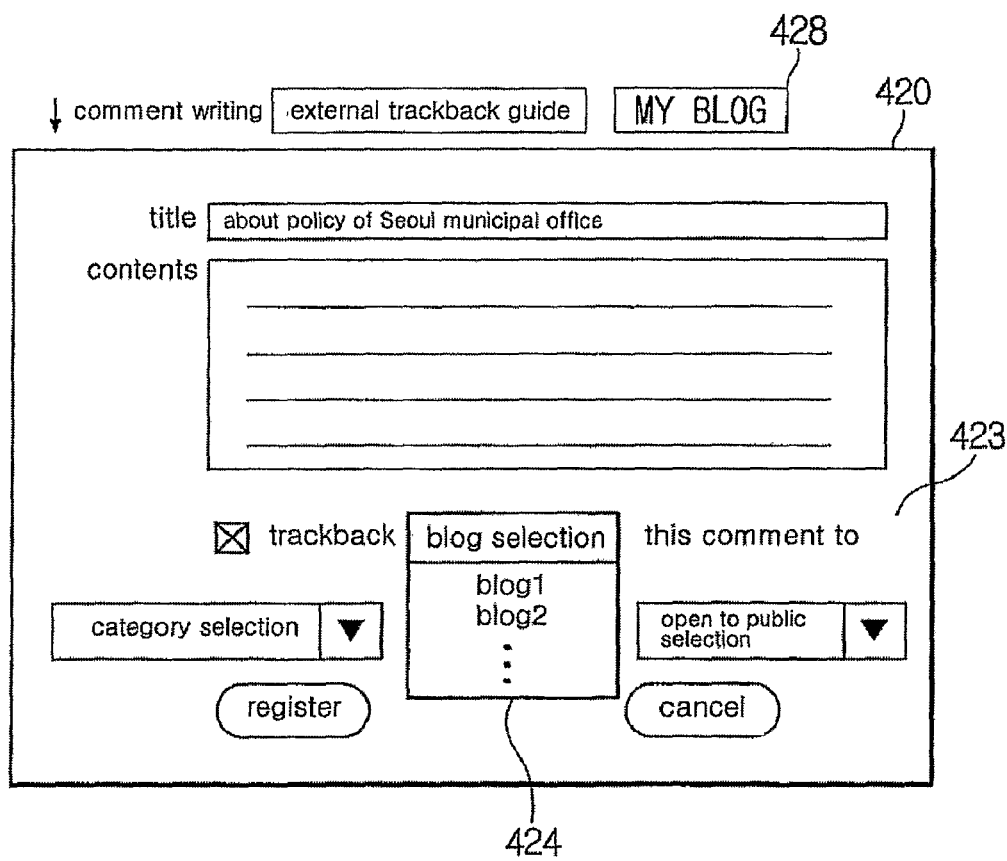

[Figure. 7]
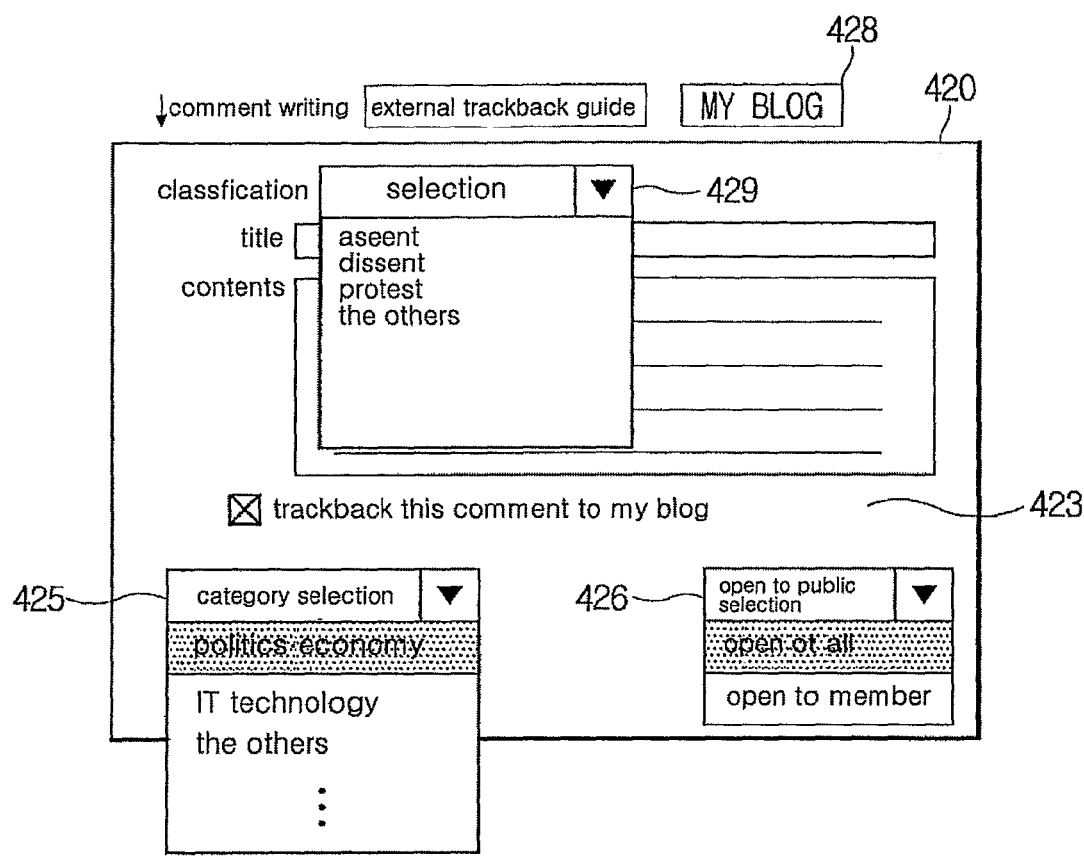

[Figure. 8]
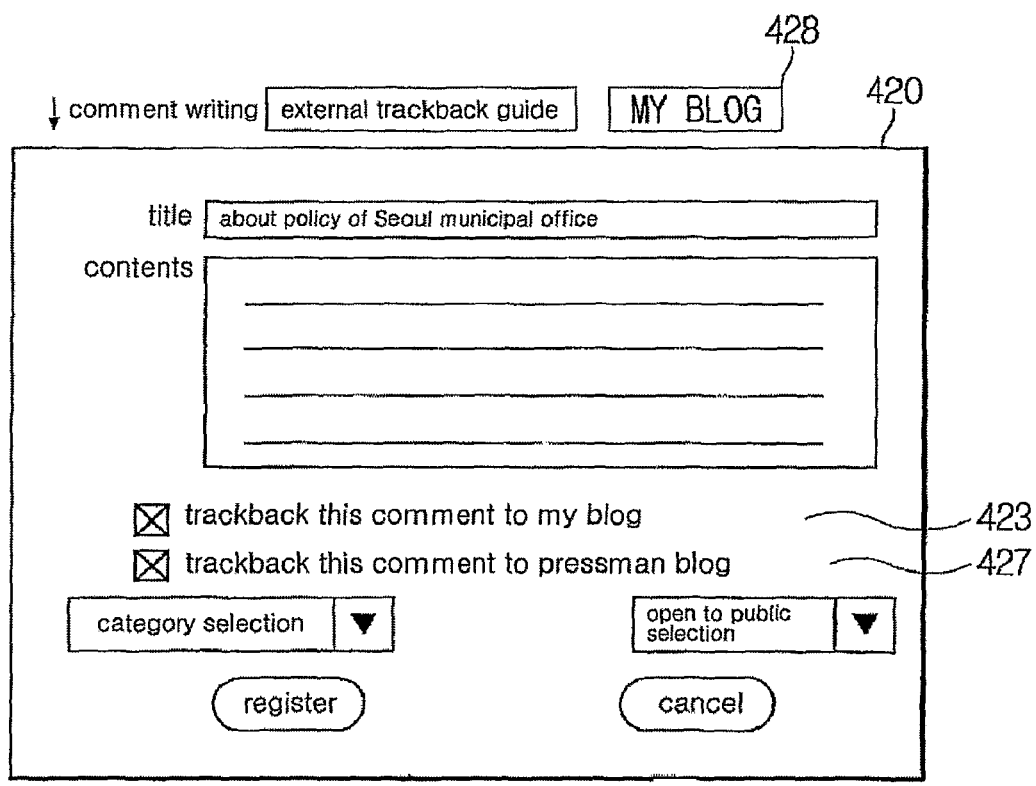

[Figure. 9]
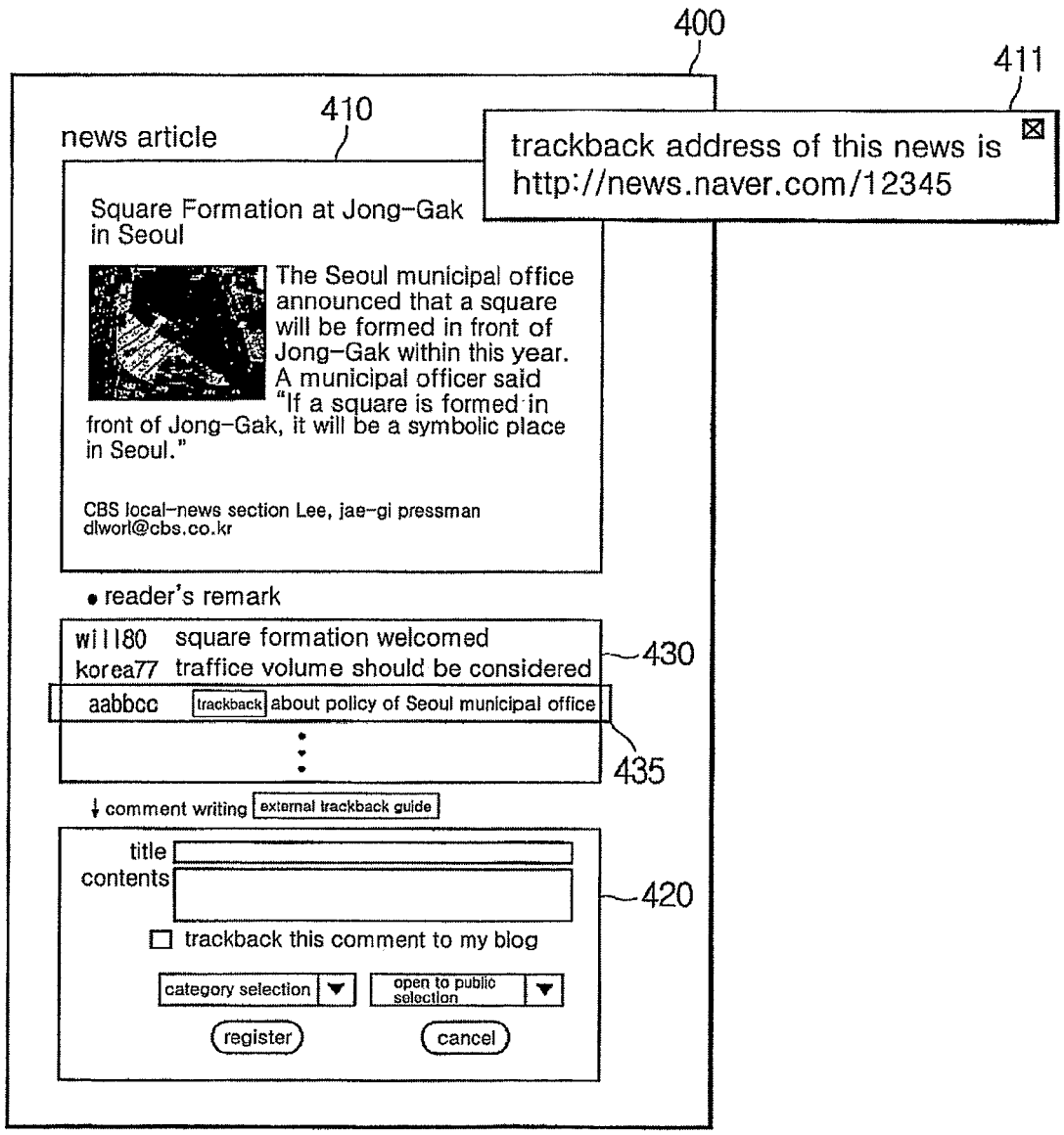

[Figure. 10]
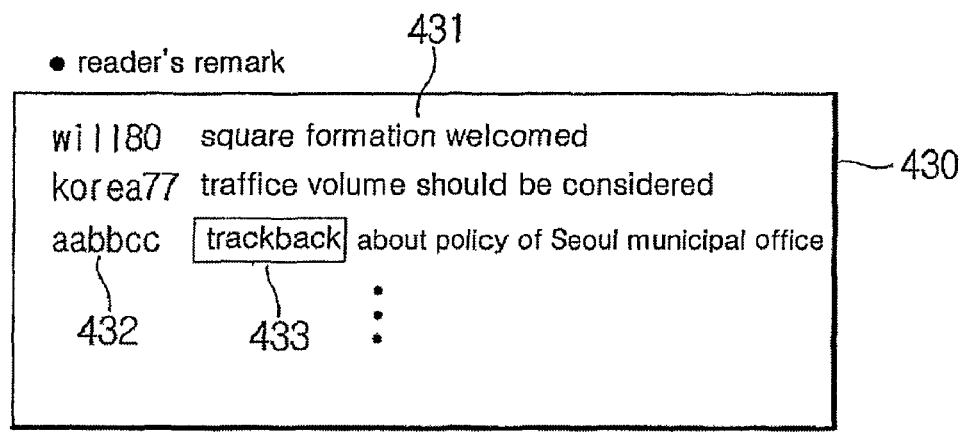

[Figure. 11]
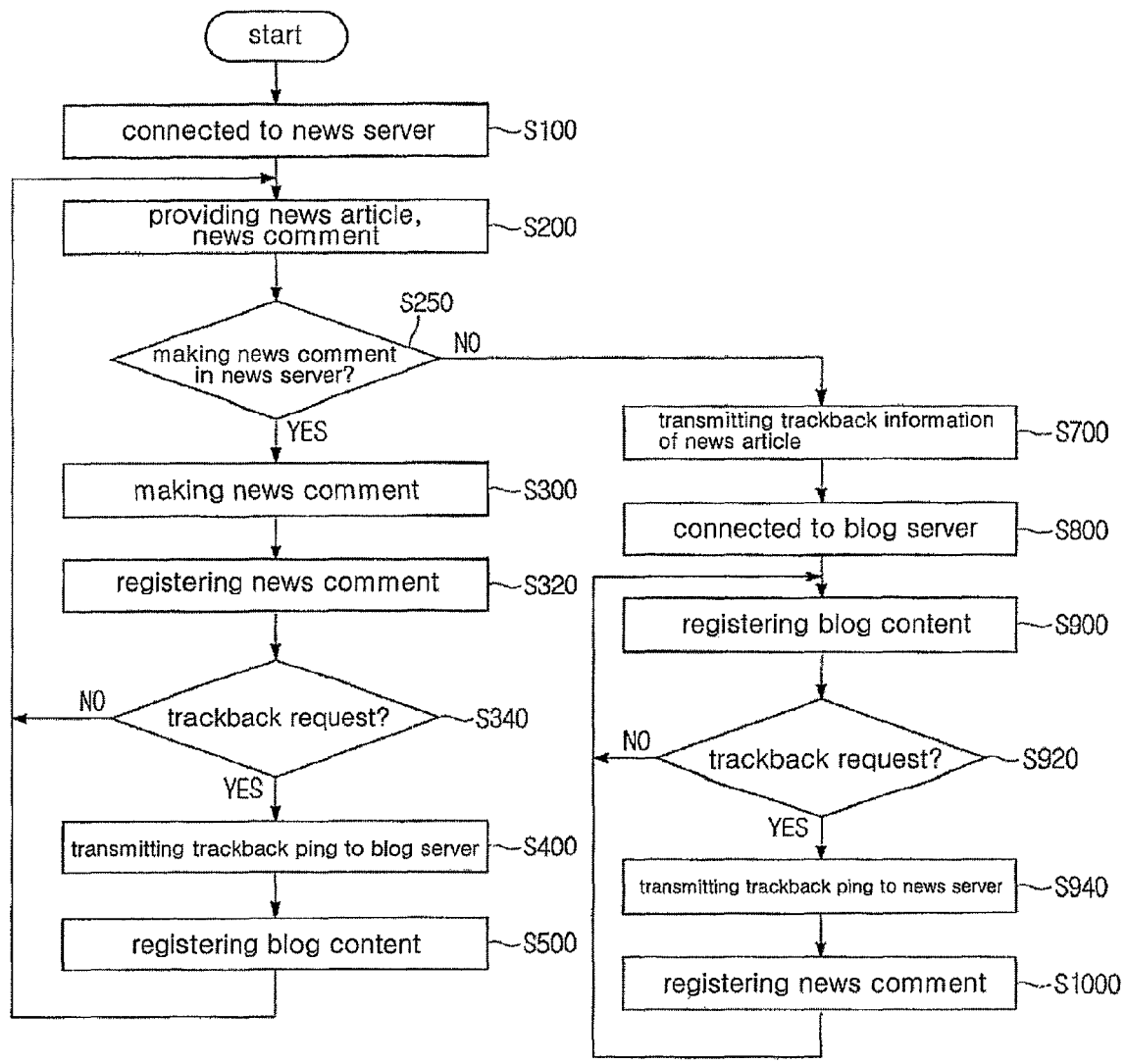

[Figure. 12]
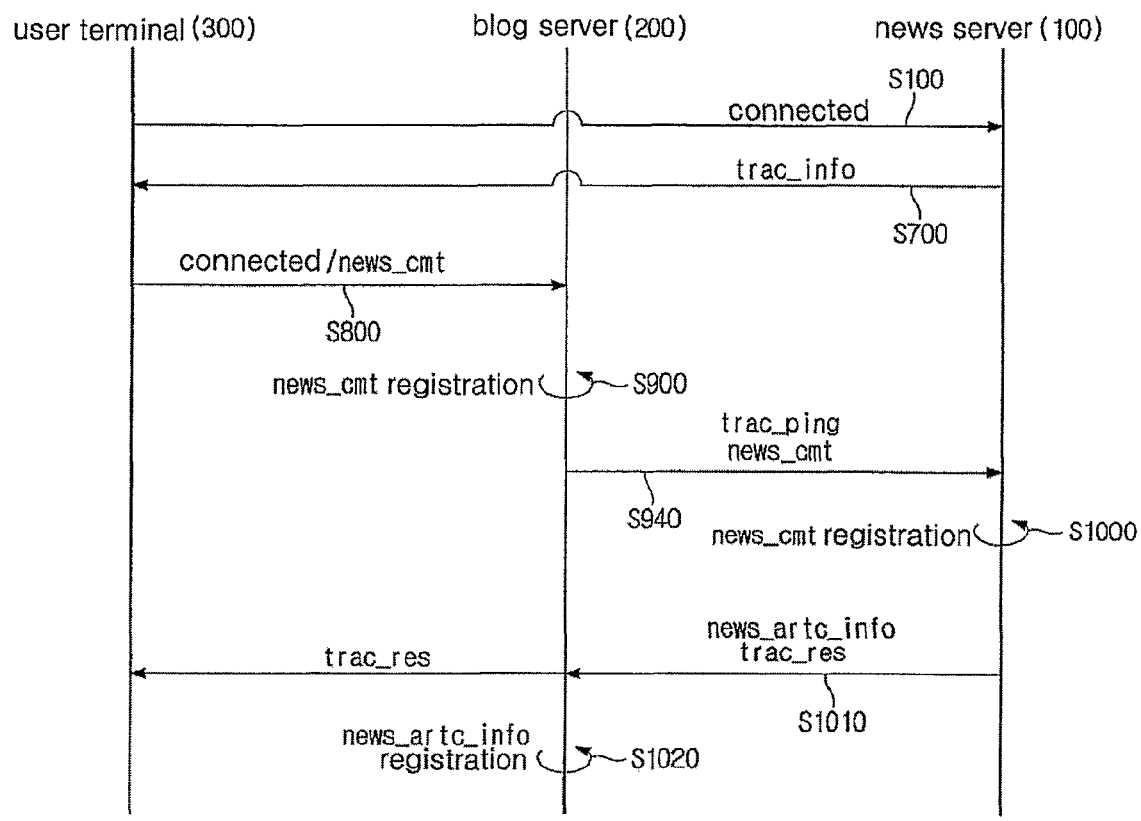

[Figure. 13]
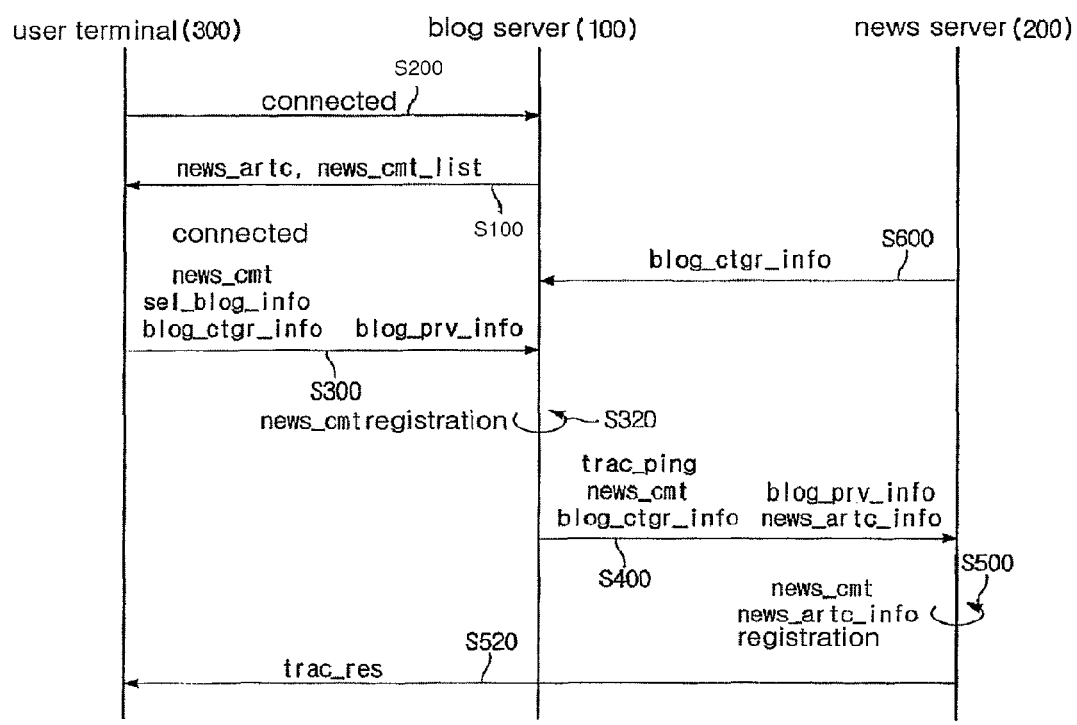

NEWS SERVER FOR TRACKBACK BETWEEN NEWS AND BLOG AND METHOD FOR INTERCONNECTION THEREOF

CROSS-REFERENCES TO RELATED APPLICATIONS

This application is a U.S. national phase application, pursuant to 35 U.S.C. §371, of PCT/KR2007/000301, filed Jan. 18, 2007, designating the United States and published on Jul. 26, 2007 as WO 2007/083930 A1, which claims priority to Korean application 10-2006-0006462, filed Jan. 20, 2006. The entire contents of the aforementioned patent applications are incorporated herein by this reference.

TECHNICAL FIELD

The present invention relates to a news server for trackback between a news and a blog and a method for interconnecting thereof.

BACKGROUND ART

As the internet technology has developed, news service and blog service through the internet communications network are getting used much more. The internet news service of the related art simply provided an article to readers by means of internet. Recently, however, a user may leave a feedback on a certain article by means of a reply, comment or talkback function, which is then provided to other users of the news service in the form of a bulletin board or list. This kind of internet news service makes it possible for the service users to easily share their opinion about an article, grasp the direction of the public opinion about the subject of the article, and discuss with other users about the news.

The term 'blog' is the abbreviation of 'weblog' which is the compound word of 'web' and 'log'. Blog service means a service providing a web page operated by an individual. Blog functions as a one person media operated by a user himself (or herself) thereby making the user not only an information consumer but also an information provider such that he (or she) might build a personalized media. For this reason, the number of blog users currently increases. According to the general way to operate the blog service of the related art, a blog operator posts a blog content and the other user reads the blog content and leaves a comment on it.

Meanwhile, as the blog service develops, a trackback function has been added to the service so as to provide a better way for the user to leave his or her opinion about the blog content. While the comment of the related art is left in the bulletin board of the corresponding blog, the trackback function enables the comment to be left not only in the corresponding blog but also in other blogs. When a user wants to leave a comment upon a content of "A" blog, for example, (s)he may input the comment not in "A" blog but in his(her) own "B" blog and set the "A" blog as a trackback destination such that a portion of the contents of the "B" blog be posted in the bulletin board of the "A" blog. That is, the trackback function makes two different blogs linked to each other, thereby inducing more interaction as to a certain subject and facilitating easier sharing for information and idea on the subject.

On the other hand, since a number of users make comments on a certain article in an internet news service, the number of letters of a comment is limited to a predetermined number to prevent a user from expressing his (her) opinion too much.

Thus, there are problems in the internet news service of the related art in that it is difficult for a user to express his or her in-depth opinion through a comment, it is difficult for a user to make consecutive discussion with other users about a subject when lots of users leave lots of comments causing a comment to be subordinate rapidly, and it is impossible for a user to manage his (her) own comment.

In case of a blog operator who wants to provide more information to other users of an internet news service when an article of the news service corresponds to the subject of his (her) blog, (s)he may simply leave the URL address of his (her) blog as a comment on the article, which is, however, a troublesome way to lead the users to his (her) blog since the users are required to copy the URL address and paste it to the web browser to access his (her) blog.

Finally, it is difficult to make a sound discussion in case of comments in news services since there is much likely to be irresponsible curse and swearword due to its one-time writing and anonymity.

SUMMARY OF THE DISCLOSURE

In one aspect, the present invention is directed to a news server for trackback between a news and a blog and a method for interconnecting thereof that substantially obviates one or more of the problems due to limitations and disadvantages of the related art.

In one embodiment, the present invention provides a news server for trackback between a news and a blog and a method for interconnecting thereof, wherein the news server comprises a trackback interconnecting means for transmitting a trackback message to the blog server such that a user may save and continuously manage his (her) news comment in his (her) blog by setting trackback between a comment of the news server and a content of the blog server, and may express his or her in-depth opinion on the subject of an article since it is possible to make a comment in the form of a blog content which facilitate longer comment with various multimedia such as photo and music than the news comment of the related art.

In another embodiment, the present invention provides a news server for trackback between a news and a blog and a method for interconnecting thereof, wherein when a user selects a news comment for which trackback is set up, the news server activates the blog content including the news comment such that one may lead a user of the news service used by the public to his (her) own blog, and may be prevented from using irresponsible curse and swearword when writing the news comment since his (her) own blog is interconnected with the news service.

In a further embodiment, the present invention provides a news server for trackback between a news and a blog and a method for interconnecting thereof, wherein the news server provides a user terminal with the URL information of a news for trackback such that a user may easily trackback the news comment made in his (her) blog to the news server.

In yet another embodiment, the present invention provides a news server for trackback between a news and a blog and a method for interconnecting thereof, wherein the news server transmits the text or URL information of a news article to the blog server which inserts the text or URL information in the blog content where the news comment is made such that a user of the blog may easily find out which news the comment is made on.

In a another embodiment, the present invention provides a news server for trackback between a news and a blog and a method for interconnecting thereof, wherein a user designates his (her) blog as a trackback target and the news server automatically activates the designated blog when the user select a trackback option for making a news comment such that the user may avoid a cumbersome step to input the URL address of his (her) blog whenever setting up trackback.

In a further embodiment, the present invention provides a news server for trackback between a news and a blog and a method for interconnecting thereof, wherein a user designates more than one blog as trackback targets and the news server requires him (her) to select at least one among the designated blogs when making a news comment using the trackback option such that the user having more than one blog may easily select an appropriate blog as a trackback target based on the nature or purpose of the news comment.

In a still further embodiment, the present invention provides a news server for trackback between a news and a blog and a method for interconnecting thereof, wherein the news server receives a category list and a privilege to open list of the blog designated by a user as a trackback target and, when the user makes a news comment, requires the user to select an appropriate category and privilege to open of the blog in which the news comment would be made such that the user may efficiently make a news comment corresponding to the category and privilege to open of his (her) own blog and thus the convenience in operating the blog may be improved.

In an addition embodiment, the present invention provides a news server for trackback between a news and a blog and a method for interconnecting thereof, wherein the news server further receives a user s evaluation of the news such as assent, dissent and protest when the user makes a news comment such that it might be possible to prevent deterioration of quality of the news bulletin board due to the extemporary and impulsive news comment since the user is compelled to carefully consider how to evaluate the news before making a news comment.

In another embodiment, the present invention provides a news server for trackback between a news and a blog and a method for interconnecting thereof, wherein the news server sets up the corresponding news pressman's blog as a trackback target of a news comment if a user wants so such that the user may ask the pressman more detailed information about the news, request the pressman to correct the news, or refute the news, and the pressman may immediately see the reader's reaction to the news, refer to the direction of the public opinion, and establish closer network with readers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method for interconnecting a news provided by a news server with a blog provided by a blog server, the method comprising controlling the news server to provide a news article to a user terminal connected thereto, controlling the news server to receive a request from the user terminal for selecting the blog where a news comment on the news article would be made, controlling the news server to activate the selected blog through the blog server, controlling the blog server to receive the news comment from the user terminal and register the news comment as a blog content, controlling the blog server to receive a request from the user terminal for trackback of the news comment and transmit a trackback request to the news server, and controlling the news server to register the news comment in a news bulletin board.

In another aspect of the present invention, there is provided a news server for trackback between a news and a blog, the news server comprising means for providing a news article to a user terminal connected to the news server, means for providing a news comment on the news article to the user terminal after receiving the news comment from the user terminal, and interconnecting means for registering a blog content from a blog server as a trackback target in the news comment providing means.

It is to be understood that both the foregoing general description and the following detailed description are exemplary and explanatory and are intended to provide further explanation of the invention as claimed.

it is an advantage of the news server for trackback between a news and a blog and method for interconnecting thereof according to the present invention that the news server comprises a trackback interconnecting means for transmitting a trackback message to the blog server such that a user may save and continuously manage his (her) news comment in his (her) blog by setting trackback between a comment of the news server and a content of the blog server, and may express his or her in-depth opinion on the subject of an article since it is possible to make a comment in the form of a blog content which facilitate longer comment with various multimedia such as photo and music than the news comment of the related art.

It is an advantage of the news server for trackback between a news and a blog and method for interconnecting thereof according to the present invention that, when a user selects a news comment for which trackback is set up, the news server activates the blog content including the news comment such that one may lead a user of the news service used by the public to his (her) own blog, and may be prevented from using irresponsible curse and swearword when writing a news comment since his (her) own blog is interconnected with the news service.

It is an advantage of the news server for trackback between a news and a blog and method for interconnecting thereof according to the present invention that the news server provides a user terminal with the URL information of a news article for trackback such that a user may easily trackback a news comment made in his (her) blog to the news server.

It is an advantage of the news server for trackback between a news and a blog and method for interconnecting thereof according to the present invention that the news server transmits the text or URL information of a news article to the blog server which inserts the text or URL information in the blog content where a news comment is made such that a user of the blog may easily find out which news the comment is made on.

It is an advantage of the news server for trackback between a news and a blog and method for interconnecting thereof according to the present invention that a user designates his (her) blog as a trackback target and the news server automatically activates the designated blog when the user select a trackback option for making a news comment such that the user may avoid a cumbersome step to input the URL address of his (her) blog whenever setting up trackback.

It is an advantage of the news server for trackback between a news and a blog and method for interconnecting thereof according to the present invention that a user designates more than one blogs as trackback targets and the news server requires him (her) to select at least one among the designated blogs when making a news comment using the trackback option such that the user having more than one blog may easily select an appropriate blog as a trackback target based on the nature or purpose of the news comment.

It is an advantage of the news server for trackback between a news and a blog and method for interconnecting thereof according to the present invention that the news server receives a category list and a privilege to open list of the blog designated by a user as a trackback target and, when the user makes a news comment, requires the user to select an appropriate category and privilege to open of the blog in which the news comment would be made such that the user may efficiently make a news comment corresponding to the category and privilege to open of his (her) own blog and thus the convenience in operating the blog may be improved.

It is an advantage of the news server for trackback between a news and a blog and method for interconnecting thereof according to the present invention that the news server further receives a user's evaluation of the news such as assent, dissent and protest when the user makes a news comment such that it might be possible to prevent deterioration of quality of the news bulletin board due to the extempory and impulsive news comment since the user is compelled to carefully consider how to evaluate the news before making the news comment.

Finally, it is an advantage of the news server for trackback between a news and a blog and method for interconnecting thereof according to the present invention that the news server sets up the corresponding news writer s blog as a trackback target of a news comment if a user wants so such that the user may ask the writer more detailed information about the news, request the writer to correct the news, or refute the news, and the writer may immediately see the reader's reaction to the news, refer to the direction of the public opinion, and establish closer network with readers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a system for interconnecting a news and a blog through trackback according to an embodiment of the present invention.

FIG. 2 shows a news server and a blog server according to an embodiment of the present invention in detail.

FIG. 3 shows a schema of trackback service according to an embodiment of the present invention.

FIG. 4 to FIG. 8 show a screen displaying a news comment intput interface according to an embodiment of the present invention.

FIG. 9 shows a screen displaying how the trackback information of a news article is provided according to an embodiment of the present invention.

FIG. 10 shows a screen displaying a news comment output interface according to an embodiment of the present invention.

FIG. 11 is a flowchart showing a process for interconnecting a news and a blog through trackback according to an embodiment of the present invention.

FIG. 12 shows a signal flow for trackback process of a blog server according to an embodiment of the present invention.

FIG. 13 shows a signal flow for trackback process of a news server according to an embodiment of the present invention.

DETAILED DESCRIPTION

Reference will now be made in detail to an embodiment of the present invention, example of which is illustrated in the accompanying drawings.

FIG. 1 shows a suitable system for interconnecting a news and a blog through trackback according to an embodiment of the present invention. The trackback interconnecting system suitably comprises at least one user terminal 300 capable of intercommunicating through a communication network, at least one blog server 200, and a news server 100.

The user terminal 300 suitably may be a computer, a PDA, portable IT equipment or a mobile as far as it can access to the communication network such as internet.

The blog server 200 is similar with the blog server of the related art in that it provides the user terminal 300 with a service for making, managing and updating a personalized webpage. The blog server 200, as shown in FIG. 2, comprises a blog service providing means 210 and a first trackback interconnecting means 230. The blog service providing means 210 provides such a conventional service as receiving a blog content 500 from the user terminal 300 and posting it. The first trackback interconnecting means 230 suitably provides a trackback service for trackback with other blogs. The first trackback interconnecting means 230 may provides the trackback service for trackback with other blogs provided by the blog server 200 itself and with the blogs provided by other blog servers connected to the communication network as well.

The news server 100 suitably comprises a news article providing means 110, a news comment providing means 120, and a second trackback interconnecting means 130. The news article providing means 110, as in the conventional case, provides a news article (news_artc) to the user terminal 300. The news article (news_artc), as shown in FIG. 3, may be provided in the form to be displayed on the screen of the user terminal 300 connected to the news server 300.

The news comment providing means 120 suitably receives a news comment (news_cmt) on the news article (news_artc) from the user terminal 300 and provides the user terminal 300 with the news comment (news_cmt). The news comment providing means 120 suitably comprises a news comment inputting means 122, a news comment database 124, and a news comment outputting means 126.

The news comment inputting means 122 suitably provides the user terminal 300 with a news comment input interface 420 through which the news comment (news_cmt) is received. The news comment (news_cmt) is classified according to the news article (news_artc) and saved in the news comment database 124. The news comment outputting means 126 suitably provides a news comment output interface 430 for providing the user terminal 300 with at least one news comment (news_cmt) per a news article (news_artc).

The second trackback interconnecting means 130 suitably communicates with the first trackback interconnecting means 230 and provides a service for trackback between the blog content 510 and the news comment (news_cmt, 435). When trackback is requested, one of the first trackback interconnecting means 230 of the blog server 200 and the second trackback interconnecting means 130 of the news server 100 transmits a trackback ping to the other which replies to it so that they are interconnected with each other.

The trackback ping transmitted when track back is requested may be constructed as follows.

POST http://www.blog.naver.com/trackback/5
Content-Type: application/x-www-form-urlencoded; charset=utf-8
title=Foo+Bar&url=

In this instance, the 'title' is the title of the blog content 510 or news comment (news_cmt) and the excerpt is the entire or a portion of the body of the blog content 510 or news comment (news_cmt). The 'url' indicates the URL address of the original text. In case of trackback of the news comment (news_cmt) made through the news server 100 to the blog server 200, the URL address of the HTML page where the corresponding news comment (news_cmt) is posted is set as the 'url'. On the other hand, in case of trackback of the blog content 510 made through the blog server 200 to the news server 100, the URL address of the HTML page where the corresponding blog content 510 is posted is set as the 'url'.

The news server 100 or blog server 200 which received trackback request through a trackback ping (trac_ping) verifies the validity of the trackback ping (track_ping). If it is valid, the trackback target is posted on the blog bulletin board or the news comment bulletin board, and then a message of successful trackback is transmitted to the server which requested the trackback. Otherwise, a message of failure of trackback is transmitted to the server which requested the trackback.

More various functions may be suitably embodied in the trackback service between a news and a blog if the trackback ping (trac_ping) further includes supplementary information. Hereinafter, referred to FIG. 3 to FIG. 6, the each cases of the various functions will be made.

FIG. 3 shows a suitable scheme of trackback interconnection between a news and a blog according to an embodiment of the present invention. The news server 100 suitably provides the user terminal 300 with the picture on the left of FIG. 3. The news service picture suitably comprises a news article 410, a news comment output interface 430, and a news comment input interface 420. As shown in FIG. 3, they may be suitably provided all together as elements of one picture while each of them, according to a user's option, may be displayed by means of pop-up or picture conversion.

The blog server 200 suitably provides the user terminal 300 with the picture on the right of FIG. 3. The blog service picture may suitably comprise a blog content 510 and a blog category 530 on one side of the picture.

When trackback is set between the news server 100 and the blog server 200, a user may select one of the news server 100 or blog server 200, make a comment though the selected one, and request a trackback of the comment to the other, such that each of the news comments 435 and blog content 510 of the same contents as shown in FIG. 3 may be provided by the each corresponding servers 100, 200.

First, explanation will be made on the embodiment where the user terminal 300 makes the news comment (news_cmt) using the news comments input interface 420 provided by the news server 100 and then requests a trackback to the blog server 200. In this case, the news comments input interface 420 suitably may comprise a news comment input unit 421, 422 for receiving the input of the news comment (news_cmt) and a trackback selection unit 423 for requesting a trackback of the inputted news comment (news_cmt).

To set up a trackback with the blog server 200, the news server 100 should be aware of the URL information of the blog to which a user wants a trackback. FIG. 4 shows an embodiment where the trackback selection unit 423 further comprises a URL address input window for receiving the URL information of the blog from the user terminal 300.

Optionally, as shown in FIG. 5, the news server 100 suitably may comprise a user information database to store designated blog information (blog_info) by users, the designated blog information including the URL information of a blog to which a user wants trackback. The second trackback interconnecting means 130 may trackback the news comment (news_cmt) inputted through the news comment input unit 421, 422 based on the designated blog information when a users requests a trackback through the trackback selection unit 423. According to this embodiment, convenience of making a news comment improves since a user does not have to input the URL information of his (her) blog whenever (s)he makes a news comment.

In the case of a user who operates a plurality of blogs, for example, blog A and blog B, it is desirable that the user manages his (her) blogs more specially by setting up the blogs as trackback targets based on the subjects of news articles, for example, by setting up the blog A as a trackback target for a political news and setting up the blog B as a trackback target for a IT news. For this purpose, as shown in FIG. 6, a plurality of the designated blog information classified by users is suitably stored in the user information database 140, at least one among the plurality of the designated blog information is selected 424 by the user terminal 300 through the trackback selection unit 423, and the second trackback interconnecting means 130 suitably sends a trackback request for the news comment inputted through the news comment input unit 421, 422 according to the selected designated blog information (sel_blog_info).

In most blog services, as shown in FIG. 3, a user may set a blog category 530 so as to post a blog content based on its subject. It is preferred that, therefore, a user may trackback a news comment (news_cmt) to a blog according to the blog category 530 pre-registered through the blog server 200 by the user. For this purpose, as shown in FIG. 7, a blog category 530 corresponding to the designated blog information (blog_info) is suitably further selected by the user terminal 300 through the pull-down menu 425 of the trackback selection unit 423, the second trackback interconnecting means 130 trackbacks the news comment (news_cmt) with the selected blog category information (blog_ctgr_info), and the blog service providing means 210 posts the news comment (news_cmt) on the selected category as a blog content 510. In this case, the news server 100 receives in advance from the blog server 200 the category information of the blog corresponding to the designated blog information (blog_info) and transmits it to the user terminal 300 when a news comment is inputted. According to this embodiment, inconvenience is reduced in that a user does not have to re-categorize the news comment according to the created blog category.

Recently, a blog service creates a privilege to open for each of the blog contents so as to prevent the infringement of the individual privacy. It is preferable that a user creates a privilege to open when (s)he makes a news comment (news_cmt) in consideration of the characteristics of the blog service to which many and unspecified persons may access, so as to prevent the individual's thought or privacy from being revealed. For this purpose, as shown in FIG. 8, a privilege to open with respect to the blog corresponding to the designated blog information (blog_info) is further selected by the user terminal 300 through the trackback selection unit 423, the second trackback interconnecting means 130 trackbacks the news comment (news_cmt) with the selected privilege to open information (blog_prv_info), and the blog service providing means 210 posts the news comment (news_cmt) according to the selected privilege to open. Consequently, inconvenience is reduced in that user does not have to access to his (her) blog again after making a news comment (news_cmt) to set up a privilege to open with respect to the trackbacked news comment. To further improve the users convenience, the news comment (news_cmt) is configured to be "open to public" as a default when the news comment (news_cmt) is made, and the news comment (news_cmt) may be changed to be "close to public" at the user's option through the news server 100 or blog server 200 when the new comment (news_cmt) is made or after the news comment is registered.

According to the related art, a reader of a news article who wants to request more detailed information about the news article or send a feedback on the news article such as objection, protest, and encouragement, needs to call the pressman of the news article or to send the corresponding contents to the pressman through e-mail by driving a separate e-mail application. However, since the method of the related art requires additional time and endeavor, only a few readers send the pressman their opinion on the news article as a feedback. According to the embodiment of the present invention shown in FIG. 8, however, the news article providing means 110 is configured to provide a pressman blog information 114 of the pressman in addition to the news article, the trackback selection unit 423 is configured to further receive the selection of whether to trackback the news comment (news_cmt) to the pressman s blog from the user terminal 300, and if so, the second trackback interconnecting means 130 further trackbacks the news comment (news_cmt) inputted through the news comment input unit 420 to the pressman s blog according to the pressman blog information (prss_blog_info). Consequently, much more users or readers are likely to send their opinion on a news article to the corresponding pressman as a feedback conveniently.

Below is explained an embodiment of the present invention where a blog content 510 is made through a blog server 200 and is trackbacked to a news server 100 as a news comment (news_cmt). The trackback from the blog server 200 to the news server 100 is similar with the trackback of the related art between the blog servers 200, 250. For the trackback to the news server 100, the trackback information of a news article on which a news comment (news_cmt) would be made should be known. Thus, as shown in FIG. 9, it is desirable that the news article providing means 110 of the present invention further provides news article trackback information 411 in addition to the news article, the news article trackback information 411 comprising the URL information of the news article (news_artc). According to this embodiment, a user accesses to his (her) blog, makes a news comment on the news article in the form of a blog content 510, and sets up trackback of the news comment to the corresponding news server 100 based on the news article trackback information 411 provided. The second trackback interconnecting means 130 of the news server 100 receives the trackback request from the first trackback interconnecting means 230 of the blog server 200 and, according to the trackback request, outputs the blog content transmitted from the blog server 200 through the news comment outputting means 126 of the corresponding news article. According to this embodiment, a user may make a news comment (news_cmt) accompanied by various multimedia by using the blog content input interface of his (her) own blog which (s)he is used to.

It is desirable that, as shown in FIG. 5, the news comment input interface 420 further comprises a designated blog activation selection unit 428 so that the designated blog may be activated according to the designated blog information (blog_info) when the user terminal 300 selects the designated blog activation selection unit 428. Thus, the inconvenience that the user needs to activate his (her) blog while reading a news article to access the blog and make a blog content may be obviated.

A news comment (news_cmt) is closely related to the corresponding news article since the news comment (news_cmt) is posted right below the news article. On the other hand, when a news comment (news_cmt) and a blog content 510 are interconnected to each other, it is difficult for other users to understand the blog content 510 unless the news article is also posted together with the blog content 510. To solve such problem as above when the trackback between a news article and a blog content is set up, it is preferable that the second trackback interconnecting means 130 transmits the text or URL information of the corresponding news article (news_artc_info) to the first trackback interconnecting means 230, and the blog service providing means 210 further displays, as shown in FIG. 3, a news article access information 520 comprising the text or URL information of the news article in the blog content 510. In case of the trackback from the news server 100 to the blog server 200, the text or URL information of the news article (news_artc_info) is transmitted to the first trackback interconnecting means 230 when the trackback ping (trac_ping) is transmitted thereto. In case of the trackback from the blog server 200 to the news server 100, on the other hand, the text or URL information of the news article (news_artc_info) is transmitted to the first trackback interconnecting means 230 when the response to the trackback ping (trac_ping) is transmitted thereto.

Hereinafter, a news comment outputting means 126 for providing a completed news comment to users will be explained. The news comment outputting means 126 provides a user terminal 300 with a news comment output interface 430. The news comment output interface 430, as shown in FIG. 10, may comprise a news comment list output unit 431 for outputting a list of the news comments (news_cmt), a commentator information display unit 432 for displaying at least one of the ID, personacon (personality+icon), and nickname of the user who made the news comment (news_cmt) for every each of the news comments (news_cmt), and a trackback information display unit 433 for displaying the news comment (news_cmt) for which the trackback with the blog is set up. It is desirable that the trackback information display unit 433 carries out the function to notify on the news comment list that the trackback between a specific news comment and a blog is set up, and the function to link the news comment to the blog according to the trackback as well. For example, when a user terminal 300 selects the trackback information display unit 433 by clicking, the blog to which the trackback is set up may be activated by means of pop-up or picture conversion so that a network between the news service users and the blog operators might be formed.

The title and contents of the news comment (news_cmt) may be inputted separately through the news comment input unit 122, and the news comment output interface 430 may be configured to provide only a title list of the news comments (news_cmt) to the user terminal 300, and provide the contents of the news comment (news_cmt) at the user's option. Further, the news comment output interface 430 may be configured to output only the news comments (news_cmt) for which trackbacks are set up at the user's option.

Hereinafter, referring to FIG. 11, a method for interconnecting a news and a blog by means of trackback will be explained. First, a user terminal 300 accesses a news server 100 through a communication network (S100), and then the news server 100 provides the user terminal 300 with a news article and/or news comments made on the news article (S200). Then, the news server 100 receives a request from the user terminal 300 for selecting the news server 100 or a blog server 200, through which a news comment will be made (S250). If the user terminal 300 makes a news comment using the news server 100, the news comment is registered on the news bulletin board (S320). Then, the news server 100 determines whether the user terminal 300 requests the trackback of the news comment (S340). If so, the news server 100 transmits a trackback ping to the corresponding blog server 200 (S400), and then the blog server 200 registers the news comment as a blog content (S500).

If the user terminal 300 selects a blog server 200 to make a new comment at the S250 step above, the news server 100 activates the user s predetermined blog thereby making the user terminal 300 connected to the corresponding blog server 200 (S800). According to an embodiment of the present invention, the news server 100 transmits a news article trackback information including the URL information of the news article to the user terminal 300 before the user terminal 300 accesses the blog server 200, so that the user might easily input the URL information of the news article to which the news comment made through the blog would be trackbacked. Next, if the user terminal 300 connected to the blog server 200 makes a news comment on the corresponding news article in the form of a blog content, the blog server 200 registers the news comment as a blog content (S900). Then, the blog server 200 determines whether the user terminal 300 transmits a trackback request with respect to the news comment registered as a blog content (S920). If receiving the trackback request from the user terminal 300, the blog server 200 transmits a trackback ping to the news server 100 (S940), and then the news server 100 registers the blog content on the news bulletin board (S1000).

Referring to FIG. 12 which shows a signal flow of the blog server 200 during the trackback interconnecting process of FIG. 11 between the news and the blog, the trackback process at the blog server 200 will be explained in detail. As shown in FIG. 12, the news server 100 activates a pre-designated blog of a user, thereby connecting the user terminal 300 to the blog server 200 (S800).

Next, as the second step, the user terminal 300 makes a news comment (news_cmt) using the blog service provided by the blog server 200. The blog server 200 registers the news comment (news_cmt) as a blog content (S900) and, as the third step, transmits a trackback request (trac_ping) to the news server 100 (S940).

Finally, as the forth step, the news server 100 registers the news comment (news_cmt) on the news bulletin board (S1000).

It is desirable, as shown in FIG. 3 and unlike other general news comments, that when other users are willing to see the news comment (news_cmt) for which a trackback is set up, the blog content where the news comment (news_cmt) is made is configured to be activated immediately. For this purpose, as the fifth step, the user terminal 300 accesses the news server 100 and selects the news comment registered on the news bulletin board. And then, as the sixth step, the news server 100 activates the blog content where the news comment (news_cmt) is registered if the news comment the user terminal 300 selects has been trackbacked from the blog server 200. As illustrated in FIG. 3, the news server 100 may link the title of the news comment (news_cmt) with the URL information for accessing the corresponding blog content and activate the blog content by means of pop-up or picture-conversion when the user terminal 300 clicks on the news comment (news_cmt).

Meanwhile, the user should be aware of the URL information of the news article to make a news comment (news_cmt) on it through his (her) blog service. For this purpose, as shown in FIG. 12, it is desirable that the trackback interconnecting method between the news and the blog further comprises in the seventh step (S700) that the news server 100 provides in advance the news article trackback information (trac_info) including the URL information of the news article on which the news comment (news_cmt) would be made, wherein the user terminal 300 further transmits the news article trackback information (trac_info) to the blog server 200 when making the news comment at the second step, wherein the blog server 200 further sends the news article trackback information (trac_info) and news comment (news_cmt) to the news server 100 when sending the trackback request at the third step (S940), and wherein the news server 100 registers the news comment (news_cmt) on the news bulletin board of the corresponding news article based on the news article trackback information (trac_info) at the forth step (S1000). According to this embodiment, the user may find out the URL information of the news article for trackback without any unnecessary and burdensome process.

It is difficult for a user who accesses the blog content without using the news server 100 to understand the blog content if the blog content contains only the news comment (news_cmt) and does not contain the news article. Thus, it is preferable that the blog content further includes the information about the news article. For this purpose, the trackback interconnecting method between the news and the blog may further comprise, after the forth step (S1000), the eighth step (S1010) that the news server 100 provides the blog server 200 with the text or URL information (news_artc_info) of the news article on which the news comment (news_cmt) has been made, and the ninth step (S1020) that the blog server 200 further registers the link information (520) on the blog content for accessing the text or URL information (news_artc_info) of the news article. According to this embodiment, as shown in FIG. 3, the blog content may provide not only the news comment (news_cmt) but also the news article information.

Generally, a user makes a news comment (news_cmt) while reading a news article through a news service. Thus, the user is required to activate his (her) blog through another web browser to trackback the news comment (news_cmt) through the blog server 200, which is burdensome. To solve this kind of problem, it is desirable to designate a blog as an interconnecting object and register it in the news server 100 so as to easily activate his (her) blog. For this purpose, the trackback interconnecting method between the news and the blog may further comprise the tenth step that the user terminal 300 registers the designated blog information (blog_info) including the URL information of the blog service in the news server 100, wherein the news server 100 may be configured to activate the corresponding blog service based on the designated blog information (blog_info) at the first step (S800) when the user terminal 300 connected to the news server 100 is to make a news comment. According to this embodiment, the news server 100 may enable a user to automatically access his (her) own blog without any further step therefor.

Next, referring to FIG. 13 which shows a signal flow of the news server 100 during the trackback interconnecting process of FIG. 11 between the news and the blog, the trackback process at the news server 100 will be explained in detail.

First, the news server 100 provides the user terminal 300 with a news comment input interface with which the user terminal 300 makes the news comment (S300). At this time, if the designated blog information (blog_info) stored in the news server 100 is for a plurality of blogs, the user terminal 300 may further input the selected blog information (sel- _blog_info). The user terminal 300 may further input the blog category information (blog_ctgr_info) or privilege to open information (blog_prv_info) to be set up. The user terminal 300 may further input the information for trackback of the news comment to the blog of the pressman of the news article.

Further, as shown in FIG. 7, the user terminal 300 may input the evaluation 429 of the news by selecting one of the assent, dissent, protest, and the others. According to this embodiment, since the user is compelled to carefully consider how to evaluate the news before making a news comment, it is possible to prevent deterioration of quality of the news bulletin board due to the extemporary and impulsive news comment.

Then, the news server 100 registers the news comment (news_cmt) inputted through the news comment input interface 420 on the corresponding news bulletin board, and, if the pressman's blog is further selected, trackbacks the news comment (news_cmt) to the pressman's blog server 200 (S400).

Finally, the blog server 200 registers the trackbacked news comment (news_cmt) as a blog content (S500).

According to this embodiment, the user terminal 300 may save and manage the news comment (news_cmt) made using the news server 100 in his (her) blog without being connected to the blog service.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method for providing a connection between a news content provided by a news server and a blog provided by a blog server, the method comprising:
   providing the news content, by the news server, to a user terminal connected via a network;
   receiving a request from the user terminal for selecting a blog, the blog being associated with comments on the news content;
   activating the selected blog according to the request;
   registering the news comments as a blog content in response to receiving the news comments from the user terminal;
   receiving a request from the user terminal for trackback of the news comments and transmitting the trackback request to the news server; and
   registering the news comments on a news bulletin board of the news server.

2. The method of claim 1, further comprising:
   receiving a request from a user terminal for selecting the news comments on the news bulletin board; and
   activating the blog content via the blog server.

3. The method of claim 1,
   wherein the news server further provides Uniform Resource Locator (URL) information of the news content associated with the news comments to the user terminal,
   wherein the blog server further receives the URL information of the news content associated with the news comments from the user terminal,
   wherein the blog server further transmits the URL information of the news content and the news comments associated with the trackback request to the news server, and wherein the news server registers the news comments on the news bulletin board based on the URL information of the news content.

4. The method of claim 1, further comprising:
   transmitting text or URL information of the news content to the blog server in response to detection of registration of the news comments on the news bulletin board; and
   registering the text or URL information of the news content as a link information of the blog content.

5. The method of claim 1, further comprising:
   receiving an information comprising URL information of the selected blog from the user terminal for the registration, wherein the selected blog is activated based on the information.

6. A method for providing a link between a news provided by a news server and a blog provided by a blog server, the method comprising:
   providing a news to a user terminal connected via a network;
   providing, by the news server, the user terminal with an input interface for making a comment on the news;
   receiving the news comment inputted via the input interface and registering the news comment to a news bulletin board of the news server;
   receiving, by the news server, a trackback request from the user terminal for trackback of the news comment and transmitting the trackback request to the blog server for trackback of the news comment corresponding to the blog registered by the user terminal; and
   registering the news comment as a blog content.

7. The method of claim 6,
   wherein one or more blogs are registered by the user terminal for trackback of the news comment,
   wherein the news server further receives a request for selecting a blog among the registered blogs associated with the news comment from the user terminal,
   wherein the news server further transmits the trackback request to the blog server for trackback of the news comment to one or more blogs categorized by the blog server and selected by the user terminal, and
   wherein the blog server registers the news comment as a blog content of the selected blog.

8. The method of claim 6, further comprising:
   receiving a category list and authorizing access to select list of the blog from the blog server, wherein the news server further receives a request for selecting a category and an authorization to open the blog associated with the news comment from the user terminal, wherein the news server further transmits the selected category and the authorization to open the selected category associated with the trackback request to the blog server, and wherein the blog server registers the news comment as a blog content based on the selected category and the authorization to open.

9. The method of claim 6, wherein the news server determines whether the user terminal transmits a request for trackback to a blog of the news to the news server, and transmits a trackback request to a blog server for trackback of the news comment to the blog.

10. The method of claim 6, wherein the news server further receives an evaluation of the news associated with the news comment from the user terminal and registers an evaluation and the news comment.

11. A system comprising one or more servers, the system comprising:
- a news manager coupled to a processor of one or more of the servers and configured to receive news comments on a news article using a news input interface via a user terminal coupled to a network;
- a trackback interconnector, executable by the processor and coupled to the user terminal, configured to determine whether the user terminal requests trackback of the news comments, wherein the news comments correspond to a blog content comprising information about the news article;
- a blog manager, executable by the processor, configured to provide the blog content upon receiving the trackback request from the user terminal and to select one or more blog contents associated with the news comments, wherein the selected blog contents corresponding to the news comments are registered and updated.

12. The system of claim 11, wherein the news manager is caused to activate the blog content in response to detection of the user terminal selecting the news comment for which the blog content is registered as a trackback target.

13. The system of claim 11, wherein the news manager is caused to provide trackback information of the news article, the trackback information comprising URL information of the news article.

14. The system of claim 11, wherein the trackback interconnector is caused to provide text or URL information of the news article to the blog manager subsequent to detection of receiving a trackback request from the blog server.

15. The system of claim 11, further comprising:
- a database, coupled to the processor, configured to register designated blog information, the designated blog information comprising URL information of a blog with which the news comments are interconnected through the trackback; and
- to activate, by the processor, the blog content based on the designated blog information in response to detection of a request of news comment input requested by the user terminal.

16. An apparatus to facilitate communication between blogs, the apparatus comprising:
- a processor configured to provide news content and to receive comments on the news content using an input/output interface communicated to a user device via a network, wherein the processor determines whether the user terminal requests trackback of the comments corresponding to a blog content comprising information about the news content and transmits the blog content and address information of the news content to link the comments to the blog content according to the requested trackback; and
- a database, coupled to the processor, configured to register the comments associated with the blog content transmitted from the user terminal and the address information of the news content corresponding to the comments, wherein the processor links one or more blog contents to the comments in response to determining whether the comments relate to the one or more blog contents categorized and selected by the user terminal based on the blog contents.

17. The apparatus of claim 16, wherein the input/output interface is a web-based application that supports to link the news content and blog content.

18. The apparatus of claim 17, wherein the input interface comprises a pop-up menu and a pull-down menu supporting input comments and the trackback request by the user terminal.

19. The apparatus of claim 16, wherein the address information comprises a Uniform Resource Locator (URL) address of the news content, a URL address of a HyperText Markup Language (HTML) page on which the comments are posted, and a URL address of an HTML page on which the blog content is posted.

20. The apparatus of claim 16, wherein the database comprises a user information database for an authentication, an authorization and an accounting for providing a trackback service.

* * * * *